2,937,165
SPIRIT SOLUBLE YELLOW DYE

Norman William Fiess, Ringoes, N.J., assignor to American Cyanamid Company, New York, N.Y., a corporation of Maine No Drawing. Application December 28, 1956
Serial No. 631,023

6 Claims. (Cl. 260—145)

The invention relates to spirit soluble yellow dyes and, more particularly, to the amine salts of the chromium complexes of the coupling of anthranilic acid diazo with a phenyl methyl pyrazolone sulfonic acid, in which at least 5% of the phenyl groups bear 2-chloro- or 2,5-chloro-substituents.

The metal complexes (chromium, nickel, copper, cobalt, iron, etc.) of the yellow dyes represented by the formula:

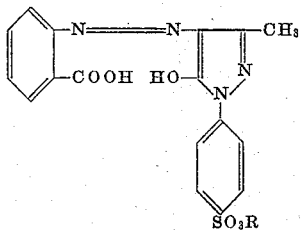

where R is an amine salt radical, have been used for imparting yellow color to metal foil, varnishes, plastic materials, inks, and the like. Such use requires a dye which is readily soluble in hydroxylated organic solvents such as ethanol, methanol, 1-3 butylene glycol, polyethylene glycol, diethylene glycol mono ethyl ether, glycerin, sorbitol, 2-phenoxy ethanol, and hexylene glycol. Although this dye has the required initial solubility in some solvents such as ethanol, there is extremely poor solution stability so that settling out and precipitation occurs on standing. This results in a change in dye strength as well as a very undesirable insoluble sediment problem.

Chlorinated dyes which differ from the above in having chlorine atoms in the 2-position or in the 2,5-position of the phenyl radical attached directly to the pyrazole ring have shades and solubility properties similar to the unchlorinated dyes and may be used for similar purposes. Furthermore, these chlorinated dyes in solution are stable against precipitation and are, therefore, preferred for use in solution. However, the chlorinated dyes bear a higher cost and this higher cost is a distinct disadvantage, which has limited their use.

The present invention shows that dyes derived from coupling anthranilic acid diazo with a mixture of phenylmethylpyrazolone sulfonic acid (1-(4-sulfophenyl)-3-methyl-5-pyrazolone) and the corresponding 2-chlorophenyl or 2,5-dichlorophenyl derivative wherein the chloro derivative constitutes as little as 5% of the coupling component on a molar basis, have the advantages and the solution stability of dyes derived solely from the chlorocoupling components.

Any desired maximum of the chlorinated components may be used, but if over about 50% is used, much of the economic advantage of the present invention is lost.

Thus, a dye made by coupling anthranilic acid diazo with phenylmethylpyrazolone sulfonic acid (non-chlorinated) containing as little as about 5%, of 2,5-dichlorophenylmethylpyrazolone sulfonic acid has high solubility and the solution maintains its stability for long periods of time with little or no precipitation of solids. In this way, by the use of the inexpensive unchlorinated material along with only a small proportion of the more expensive and more difficulty obtainable chloro derivatives, dyes are obtained with solution stability characteristics exhibited by dyes made solely from the more expensive chlorinated coupling components.

It is most surprising that such good results are obtained using such a small proportion of the chloro-coupling components. It might have been expected that there would be some advantage to using some of the chloro-coupling component to improve solution stability, but it is most unusual that by the use of as little as about 5% of the chloro-compound in the mixture, solution stability results about equal to that obtained using solely the chloro-compound.

Thus, when the unchlorinated component is used alone, up to 50% or more insoluble material forms in a 15 gram per 100 milliliter alcohol solution within 7 days, whereas, when as little as 5 or 10 mols of the chloro derivatives for each 100 mols total of coupling components, is used, negligible amounts of material precipitate out within the same period.

The dyes are ordinarily made by coupling the diazo of anthranilic acid with the pyrazolone coupling component and then converting to the metal complex and the amine salt.

Various metals are suitable for making the metal complexes such as chromium, nickel, cobalt, copper and iron, but chromium is preferred.

For preparing the amine salts, aliphatic and aromatic primary and secondary amines are suitable, and particularly secondary amines or mixtures thereof, such as diamyl amine, dibutyl amine, dicyclohexyl amine, methyl aniline, ethyl aniline, etc., give good results. It is preferred, however, to use a mixture of about 50% dicyclohexyl amine and 50% dibutyl amine for best results.

In the practice of the invention, anthranilic acid is diazotized with sodium nitrite and the diazo is coupled with the substituted pyrazolone coupling components. The azo dye is then isolated as a paste and metallized with a metal salt. Although the half metal complex has particularly useful properties, sufficient metallizing agent may also be used to form a mono metallized dye where there is a 1:1 ratio of metal to dye molecule. Addition of the amine in sulfuric acid solution causes precipitation of the amine salts of the metal complexes.

The preferred metal complex is the half chromium complex with 20% of the 2,5-dichloro-coupling component and 80% of the nonchlorinated coupling component, in the form of the amine salt using a 50:50 mixture of dicyclohexylamine and dibutylamine.

Although it is convenient to couple anthranilic acid diazo with the mixture of the coupling components, similar results may also be obtained by mixing the azo dye formed by coupling anthranilic acid diazo with the pyrazolone coupling components separately, and then converting to the metal complex amine salt in which the two dyes are coordinated through the metal, and mixing at the final, as well as at an earlier stage.

The invention is further illustrated by the examples which follow in which parts and percentages are by weight.

EXAMPLE 1

27.5 parts of anthranilic acid are dissolved in 600 parts water with 35 parts hydrochloric acid (20° Bé.) and diazotized with 34.6 parts sodium nitrite (40%) at 5–10° C. 42.75 parts of 1-(4-sulfophenyl)-3-methyl-5-pyrazolone and 13.55 parts of 1-(2,5-dichloro-4-sulfophenyl)-3-methyl-5-pyrazolone are dissolved in 600 parts of water with 69.5 parts caustic (24% solution). 44 parts sodium carbonate (anhydrous) are added and coupling to the diazo is effected at 10–12° C. The dye is heated to 50° C. and 50 parts sulfuric acid (93%) and 100 parts sodium chloride are added, the mixture is heated to 70° C. and the dye is filtered off.

The dye paste is dissolved in 714 parts water and 15.8 parts anhydrous sodium acetate at 70–80° C. and metallized at 98–100° for one hour with a basic chromium acetate solution using sufficient to form the half metal complex. The basic chromium acetate solution is prepared by dissolving at 25° C., 38.2 parts $Na_2Cr_2O_7.2H_2O$ in 177 parts water then adding 13.5 parts sulfuric acid (93%), 30.6 parts glacial acetic acid and 12.9 parts Cerelose and then heating at 100° C. for 2 hours. The metallized dye solution is then cooled to 30° C.

In a separate container a solution is prepared by dissolving in 362 parts water at room temperature, 29.8 parts dicyclohexylamine and 21.4 parts dibutylamine with 18.5 parts sulfuric acid (93%). The amine solution is added to the dye over a half-hour. The product separates as a light brown precipitate and is filtered off. If desired, it may be washed with a dilute solution of the amine acid solution to remove impurities. It is dried and ground to a brown powder.

EXAMPLES 2 to 11

The procedure of Example 1 is followed, except that the ratio of 1-(4-sulfophenyl)-3-methyl-5-pyrazolone to 1-(2,5-dichloro-4-sulfophenyl)-3-methyl-5-pyrazolone is varied.

Similar preparations are carried out with 1-(2-chloro-4-sulfophenyl)-3-methyl-5-pyrazolone.

Preparations are also carried out using mixed alkyl aniline (average molecular weight 168) in place of the dicyclohexyl amine and dibutyl amine.

The proportions used are shown in the table following.

For comparison, examples are run using the phenylmethylpyrazolone sulfonic acid alone.

*Determination of solution stability*

To approximately 50 milliliters of denatured ethanol is added, with stirring, 7.5 gram of the dye. The mixture is stirred and held at a temperature of 25° C. for 30 minutes. A small amount of weighed filter aid is added and the mixture is filtered. The amount of insoluble material is determined by weighing the dried filter residue. The stoppered filtrate is then allowed to stand at room temperature for 7 days and any solid material which precipitates is removed by filtration, dried and weighed. The following table shows the amount in percent of material which did not go into solution initially (based on the total dye used), and the amount in percent which separated out on standing (based on the total dye used), giving an index of the solution stability, based on one series of tests.

In the table are shown the relative proportions of chlorinated and unchlorinated coupling components and the amine which used.

TABLE

| Example No. | Parts by Weight Coupling Component | Parts Coupling Component (Relative Molar Proportions) | Amine | Percent Insoluble in Denatured Alcohol at Concentration of 15 g./100 ml. | |
|---|---|---|---|---|---|
| | | | | Immediate | 7 Days |
| 2 | | NC [3] | Dicyclohexylamine. | 2.0 | 45.5 |
| 3 | | NC | Dicyclohexylamine, dibutylamine equimolar. | 2.2 | [1] 32.6 |
| 4 | | NC | ----do---- | 18.9 | [2] 64.7 |
| 5 | DC [4]=67.8 | DC=100 | ----do---- | 2.7 | 0.3 |
| 6 | {NC=48, DC=6.8} | {NC=90, DC=10} | ----do---- | 1.8 | 0.4 |
| 7 | {NC=42.8, DC=20} | {NC=80, DC=20} | ----do---- | 2.2 | 0.3 |
| 8 | {NC=37.4, DC=20.4} | {NC=70, DC=30} | ----do---- | 1.8 | 0.4 |
| 9 | {NC=26.7, DC=34} | {NC=50, DC=50} | ----do---- | 2.3 | 0.3 |
| 10 | {NC=48, DC=6.8} | {NC=80, DC=20} | Mixed alkyl aniline. | 3.3 | 0.5 |
| 11 | {NC=37.4, MC=18} | {NC=70, MC [5]=30} | Dicyclohexylamine, dibutylamine. | 1.5 | 0.3 |

[1] Run at a concentration of 10 g./100 ml.
[2] Run at a concentration of 20 g./100 ml.
[3] NC—Phenylmethylpyrazolone sulfonic acid (non-chlorinated).
[4] DC—Dichlorophenylmethylpyrazolone sulfonic acid.
[5] MC—Monochlorophenylmethylpyrazolone sulfonic acid.

I claim:

1. Coordinated metallized azo dyes in the form of their amine salts in which the azo dyes are a mixture of (I)
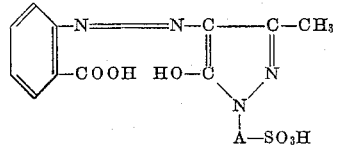

and (II)
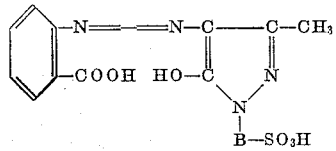

where A is 1,4-phenylene; B is selected from the group consisting of 2,5-dichloro-1,4-phenylene and 2-chloro-1,4-phenylene; and the molar ratio of II to I is between about 1:1 and 1:20.

2. The dyes of claim 1 where the metal is chromium and where the ratio of chromium atoms to azo dye molecules is from 1:1 to 1:2.

3. The dyes of claim 2 where the ratio of metal to azo dye is 1:2.

4. The dyes of claim 1 where the amines are dicyclohexylamine and dibutylamine in approximately 50:50 ratio.

5. The dyes of claim 2 where the amines are dicyclohexylamine and dibutylamine in approximately 50:50 ratio.

6. The dyes of claim 3 where the amines are dicyclohexylamine and dibutylamine in approximately 50:50 ratio.

References Cited in the file of this patent

UNITED STATES PATENTS

| 2,023,953 | Fischer et al. | Dec. 10, 1935 |
| 2,038,298 | Kiernan | Apr. 21, 1936 |
| 2,048,898 | Straub et al. | July 28, 1936 |
| 2,434,173 | Mackenzie et al. | Jan. 6, 1948 |
| 2,628,960 | Freyermuth | Feb. 17, 1953 |
| 2,826,572 | Kuster | Mar. 11, 1958 |

FOREIGN PATENTS

| 1,117,065 | France | Feb. 13, 1956 |